United States Patent
Thiebaud

(10) Patent No.: US 6,604,564 B1
(45) Date of Patent: Aug. 12, 2003

(54) TREAD PATTERN MOTIF FOR A TREAD

(75) Inventor: Philippe Thiebaud, Beaumont (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 187 days.

(21) Appl. No.: 09/704,787

(22) Filed: Nov. 2, 2000

(30) Foreign Application Priority Data

Nov. 8, 1999 (FR) .............................. 99 14094

(51) Int. Cl.$^7$ .................. B60C 11/11; B60C 11/13; B60C 103/00; B60C 115/00
(52) U.S. Cl. ................ 152/209.21; 152/209.23; 152/209.24; 152/209.25; 152/209.28
(58) Field of Search ............... 152/209.18, 209.23, 152/209.24, 209.25, 209.28, DIG. 3, 209.21

(56) References Cited

U.S. PATENT DOCUMENTS

| | | | |
|---|---|---|---|
| 4,934,424 A | * | 6/1990 | Kojima |
| 5,225,010 A | * | 7/1993 | Shisheng |
| 5,297,604 A | | 3/1994 | Lurois ................ 152/209 |
| 5,421,389 A | * | 6/1995 | Favre et al. |
| 5,503,207 A | | 4/1996 | Ochiai et al. ........... 152/209 |
| 5,769,977 A | | 6/1998 | Masaoka .............. 152/209 |
| 6,012,499 A | | 1/2000 | Masaoka ............ 152/209.18 |
| 6,382,283 B1 | * | 5/2002 | Caretta |

FOREIGN PATENT DOCUMENTS

| | | |
|---|---|---|
| AU | 0649554 | 1/1983 |
| AU | 2056592 | 1/1983 |
| EP | 0734887 | 10/1996 |
| JP | 2-293205 | * 12/1990 |
| JP | 11-59130 | * 3/1999 |
| JP | 11151912 | 6/1999 |
| JP | 11-180115 | * 7/1999 |

* cited by examiner

Primary Examiner—Steven D. Maki
(74) Attorney, Agent, or Firm—Baker Botts L.L.P.

(57) ABSTRACT

A tire tread having grooves of transverse general orientation defining a plurality of blocks arranged so as to form a tread pattern having a preferred direction of travel, the blocks having a contact face, two lateral faces, a leading face forming an angle a greater than 90° with the contact face and a trailing face. For at least one tread pattern block, the trailing face of the block is formed of an upper part extending from the running face of the block which is extended towards the inside of the tread by a lower part. Furthermore, the upper part of the trailing face is undercut and forms an angle β of less than 90° with the contact face, whereas the lower part, which is inclined so as to form an angle δ greater than 90° with the contact face, is provided with at least one recess which extends into the interior of the block.

11 Claims, 3 Drawing Sheets

TREAD PATTERN MOTIF FOR A TREAD

BACKGROUND OF THE INVENTION

The invention relates to the field of tread patterns for tires for vehicles of the heavy-vehicle type, and more particularly to tires fitted on the driving axles of these vehicles.

Application EP 734887 describes a tread pattern motif and in particular depicts a groove defining a leading face which is not undercut and a trailing face which is partially undercut from a certain depth onwards.

There has been proposed in European Patent 0485778 a tread pattern which reduces the abnormal sawtooth wear noted for tires fitted in particular on the driving axles of a heavy vehicle. This tread pattern comprises a plurality of blocks separated from each other by grooves of longitudinal and transverse orientation. One variant of execution set forth in this patent consists in providing for the walls of the blocks defined by the transverse grooves to form different angles (positive for the leading wall, negative—undercut—on the trailing wall) with a direction perpendicular to the running surface.

The application of such a solution (and all the more so that described in Application EP 734887) in the case of a tire of great tread thickness associated with a great depth of tread pattern motif (great depth of the cutouts—both groove and incision) for fitting on driving axles of the new generations of heavy vehicles having a greater level of driving torque and braking torque is of limited interest, because owing to the specific dimensions of these blocks, when they are subjected to compressive and shearing stresses in the region of contact with the ground, they may be subject to mechanical "buckling" (or alternatively rocking of the blocks), which reduces the positive effects of this type of tread pattern essentially by increasing the rate of regular wear (that is to say, the wear of the entire block).

SUMMARY OF THE INVENTION

The present invention is directed at producing a tread for a tire intended for essentially highway travel on relatively winding roads which considerably delays the appearance of irregular sawtooth wear while increasing the wear life (by increasing the thicknesses of rubber to be worn and by reducing the rate of wear). The present invention is also directed at a heavy-vehicle tire which is provided with a tread according to the invention and is intended to be fitted on driving axles.

The tread according to the invention comprises a plurality of rubber blocks defined by grooves of longitudinal and transverse general orientation, of maximum depth H, each block being provided with a contact face forming part of the running surface of the tire which is intended to come into contact with the road, a leading face and a trailing face which are formed by grooves generally of transverse orientation, said leading and trailing faces intersecting the contact face along two ridges constituting the leading and trailing edges respectively of said block.

The leading face of the blocks is inclined so as to form an angle α greater than 90° with the contact face; in the present description, the angles are, by definition, measured within the elastomeric material constituting the tread pattern element, as can be seen in FIG. 2 (according to this convention, a lateral face is said to be undercut once the angle of this face is less than 90°).

The trailing face is composed, in the direction of the height of the block, of two successive parts which divide said trailing face into a lower part and an upper part, the upper part opening onto the running surface of the tread when new.

In order to adjust the compressive strength and of shear of the motif which is subjected to compressive and shearing stresses which are exerted on its contact face during travel of a tire fitted with a tread according to the invention, the latter is characterized in that, when new, the upper part of the trailing face of at least one tread pattern block is undercut and forms an angle β of less than 90° with the contact face of said block, whereas the lower part of said face, which is oriented so as to form an angle δ greater than 90° with the same contact face, is provided with at least one recess which opens onto said lower part. Furthermore, each recess extends within the block at least as far as a plane perpendicular to the contact face and passing through that point of the lower part of the trailing face which is closest to the contact face.

Preferably, the recess or recesses do not extend within each block beyond a limit taken substantially as the surface tangentially extending the upper part of the trailing face radially towards the inside of the block, because when the recesses extend too far into a block, the equilibrium of strengths is no longer satisfied and the beneficial effects of the advocated arrangements are substantially reduced.

The tread pattern according to the invention makes it possible to combine both a reduction in compressive strength within the thickness of the tread pattern blocks in the vicinity of their trailing edge with the maintaining of a high level of shearing strength in a direction parallel to the running surface.

Preferably, the upper limit of the lower part of the trailing face of a block of the tread pattern according to the invention is located at a height H, measured relative to the running surface when new, and represents at least 20% and at most 80% of the total height P of said block. This upper limit is defined as being the parting line between the upper part and the lower part of the trailing face. If the height H is less than 20% of the total height P, the compressive strength of the edge of the block is too high, which adversely affects the wear performance; if this height H is greater than 80% of the total height P, the trailing edge of the bloc becomes too flexible under compression, which also adversely affects the wear performance.

It would appear that satisfactory results are obtained once the angles β and δ satisfy the following relationship:

$$\frac{1}{\tan\delta} > \frac{2H}{(H-P)\cdot\tan\beta}$$

with: $\delta > 90°$ et $\beta < 90°$

This relationship makes it possible, once an angle β has been selected for a pair of values of H and P, to find the optimum values of the angle δ which ensure optimum wear performance.

One embodiment consists in providing the lower part of the trailing face with a plurality of recesses which are regularly spaced apart in the transverse direction, said recesses extending over the entire height of the lower part of the trailing face.

In order to obtain a particularly noticeable effect on the wear performance, the groove ratio (equal to the ratio between the total area of all the recesses on the lower part of the trailing face and the area of said part) is between 30% and 70%. When the value of this groove ratio is greater than 70%, the resulting softening is too great, whereas when this value is less than 30%, the lower part of the block is too rigid.

Preferably, this groove ratio is equal to 50% of the area of the lower part of the trailing face.

Preferably, the greater the total surface area of the lower part of the bearing face compared with the surface of the upper part, the greater is the selected value of this groove ratio within the above limits.

DESCRIPTION OF THE DRAWINGS

The invention is described in greater detail with reference to the drawings appended by way of examples of embodiment which are in no way limitative, and in which.

DESCRIPTION OF PREFERRED EMBODIMENTS

Figure 1:
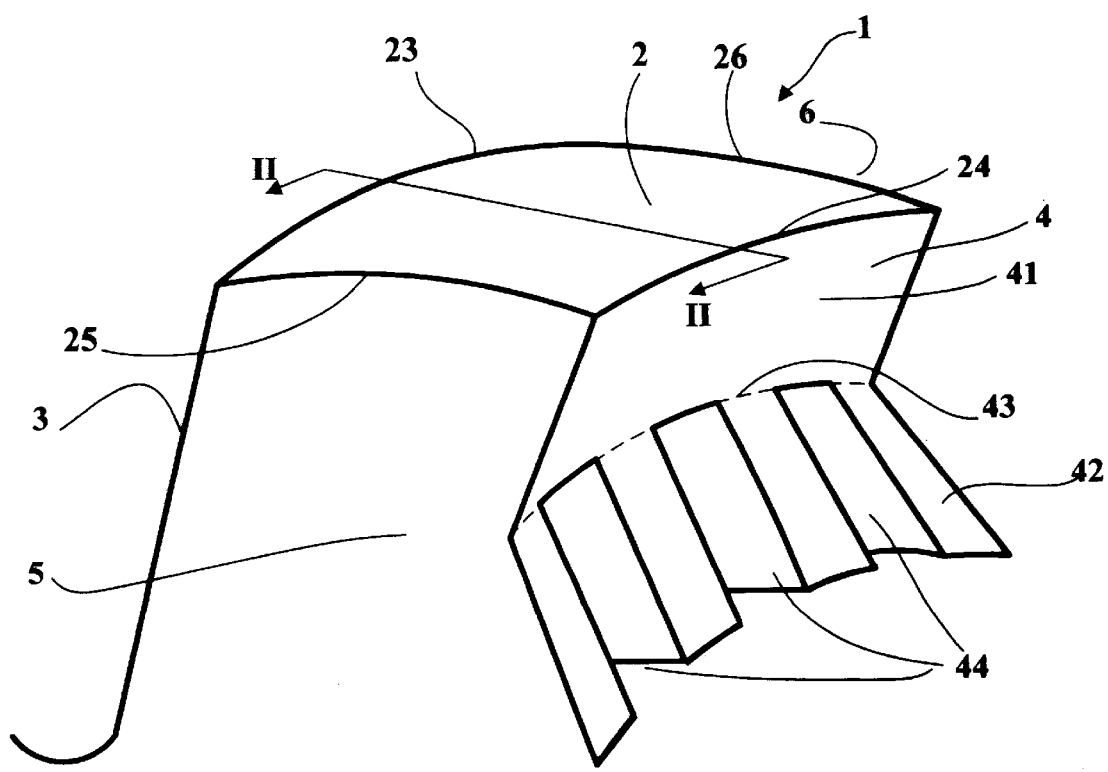
FIG. 1 shows a view of a tread pattern block according to the invention.

FIG. 1 shows a tread pattern block 1 of a tread of a tire in the form of a block having substantially the form of a parallelepiped defined by four faces 3, 4, 5, 6 and an upper contact face 2 intended to come into contact with the ground during travel of the tire fitted with said tread. The contact face 2 is defined by four ridges 23, 24, 25, 26, two of which ridges constitute a leading ridge 23 and a trailing ridge 24 depending on the direction of travel chosen ("leading ridge" is understood to mean that ridge of the block 1 which comes into contact with the ground first during travel). In the case shown, the leading ridge 23 and trailing ridge 24 have curvilinear geometries which are substantially of the same curvature.

Of the four faces, there can be distinguished two lateral faces 5, 6 spaced apart in the axial direction and two other faces 3, 4 spaced apart in the longitudinal direction (corresponding to the circumferential direction on the tire), one leading face 3 and one trailing face 4, respectively. By definition, the leading face 3 intersects the contact face 2 along the leading ridge 23 and the trailing face 4 intersects the contact face 2 along the trailing ridge 24.

Figure 2:
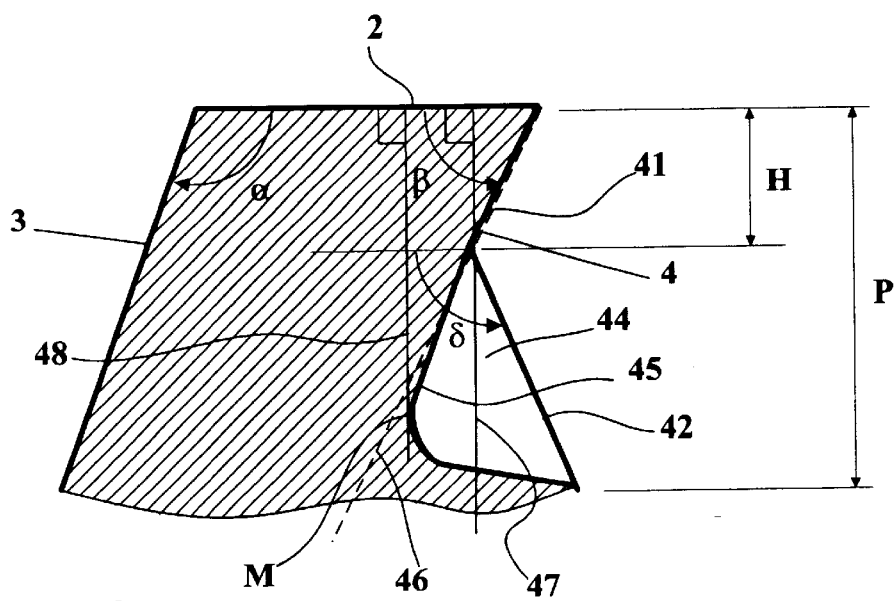
FIG. 2 shows the longitudinal section taken along the line II—II of FIG. 1.

According to the invention, the leading face 3 is formed by a surface, the generatrix of which is rectilinear and forms with the contact face 2 an angle α greater than 90°—which can be seen in FIG. 2—and the trailing face 4 comprises an upper part 41, close to the contact face 2, which is extended radially towards the inside by a lower part 42 extending over the rest of the height of the block. The upper part 41, when viewed in a longitudinal section plane alone the line II—II of FIG. 1 and shown in FIG. 2, has an average inclination which forms an angle β of less than 90° with the contact face (it is therefore undercut relative to this face); the lower part 42, when viewed in longitudinal section in FIG. 2, has an average inclination forming an angle δ greater than 90° with the contact face. The parting line 43 (shown in broken lines in FIG. 1) between these two parts, lower 42 and upper 41, follows a curvilinear profile which is substantially identical and parallel to that of the trailing ridge 24 of the block 1 when new.

Furthermore, three recesses 44 are formed, which form cavities which extend from the lower part 42 of the trailing face towards the inside of the block. These three recesses 44, of identical dimensions, are regularly distributed over the trailing face 4 in the transverse direction of the block and extend from the parting line 43 of the upper part and of the lower part to the innermost part of said lower part. These recesses 44 extend within the block 1 in one and the same substantially triangular profile, the contour 45 of which is shown in FIG. 2.

In order to obtain an optimum effect on the wear, it is necessary that, for at least one recess 44 formed on the lower part of a trailing face of a block, the point M of the trace of the contour 45 of said recess, which is the point farthest to the inside of the block when viewed in a longitudinal section plane taken along the line II—II of FIG. 1, is located in the vicinity of a virtual line 46 (shown in broken lines in FIG. 2) tangentially extending the transverse profile of the undercut upper part 41 of the trailing face 4. Viewed in the longitudinal section plane taken along the line II—II, the recesses 44 extend to the inside of the element 1 between the virtual straight line 46 extending the generatrix of the upper part of the trailing face and the straight line 47 perpendicular to the contact face of the element 1 when new. The point M is defined as being that point of the trace of the contour 45 through which a straight line 48 passes which is at a tangent to said trace and perpendicular to the contact face 2 of the element 1 when new.

Advantageously, the angle α formed by the leading face 3 with the contact face 2 is between 90° and 120°, while the angle β formed by the upper part 41 with the trailing face 4 is between 60° and 90°.

Figure 3:
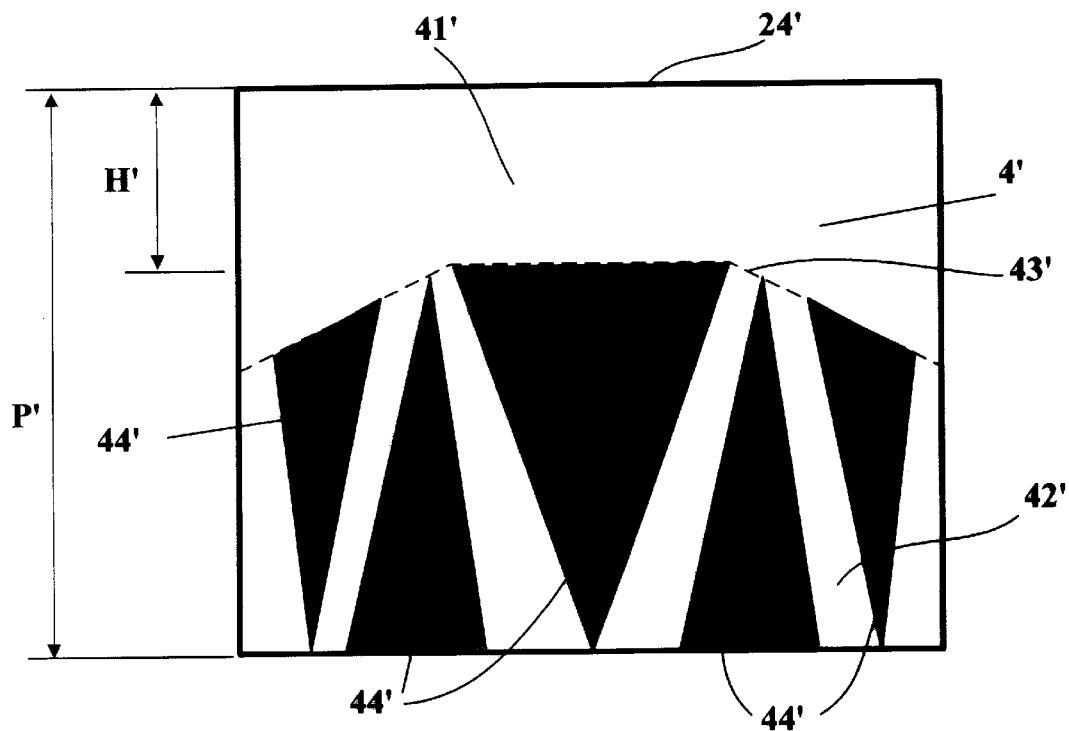
FIG. 3 shows a plane view of the trailing face of a block comprising a plurality of recesses of triangular section in its lower part.

It is of course possible, while retaining the desired effect, to produce in a tread pattern block recesses each having a specific geometry (either viewed on the trailing face or within the block). Thus FIG. 3 shows an example of embodiment of a block, of height P', comprising recesses 44' having, when viewed on the lower part of the trailing face, triangular geometries of different areas. In this FIG. 3, there is shown the trailing face 4' of a tread pattern element of a tread according to the invention. In this example, the trailing face 4' is divided along a parting line 43' formed of three segments in an upper part 41' intersecting the running face of the tread pattern element along the trailing ridge 24' and extended towards the inside of the tread by a lower part 42'. The upper part 41' is undercut relative to the running surface and the lower part 42' forms an angle greater than 90° with the running surface. This lower part 42' is provided with a plurality of recesses 44' having on said lower part triangular shapes arranged alternately. It should be noted that for good distribution of the rigidities within the tread pattern element, the volumes of the recesses in the median part of said element are greater than those of the recesses located close to the lateral faces. In this FIG. 3, the region of the lower part 42' closest to the contact face is located at a distance H' from said face.

Figure 4:
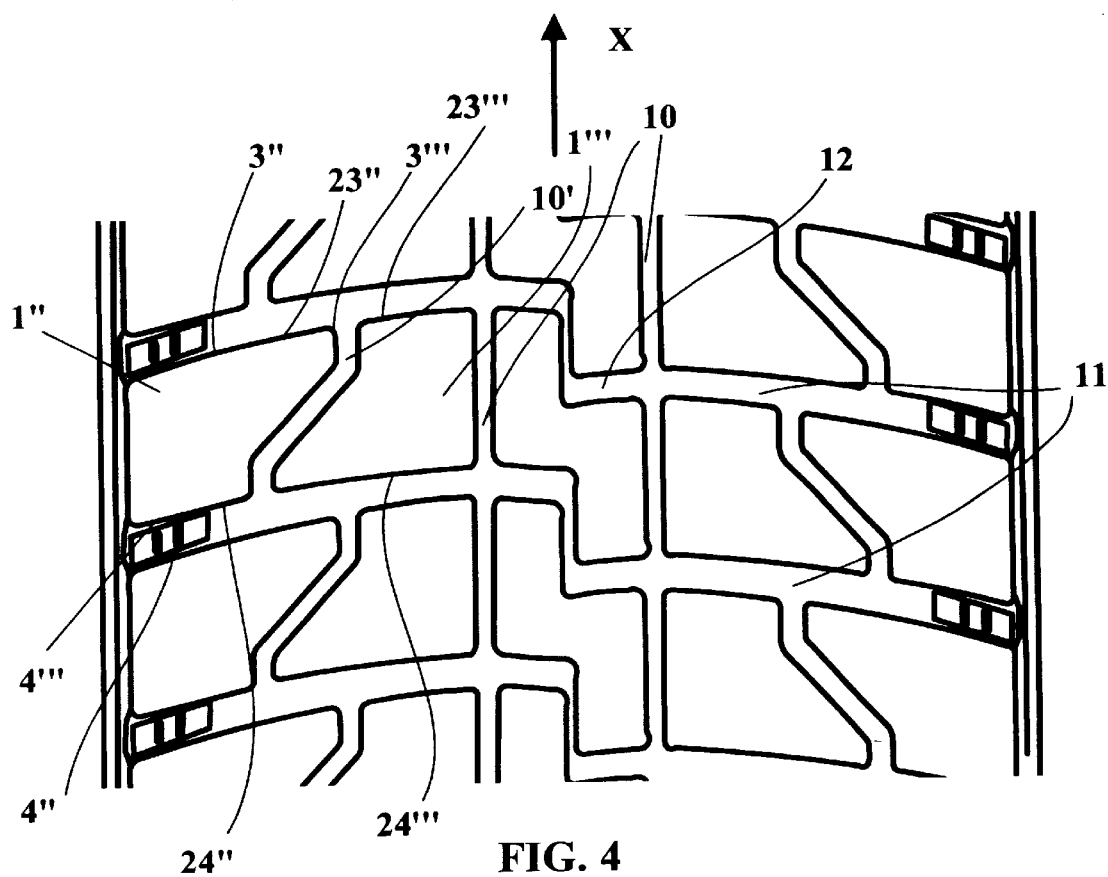
FIG. 4 shows a directional tread pattern for a heavy vehicle comprising tread pattern blocks according to the invention.

FIG. 4 shows a tread of a heavy-vehicle tire of dimension 315/80 R 22.5 comprising a radial carcass surmounted by a crown reinforcement comprising a plurality of reinforcement plies.

The tread has a directional tread pattern, that is to say one imparting to the tread a preferred direction of travel (shown by the arrow X in this FIG. 4); this tread pattern comprises two rectilinear longitudinal grooves 10 and transverse grooves 11 connecting the longitudinal grooves 10 to the axially outer edges of the tread. Furthermore, the tread pattern comprises additional grooves 10' oriented mainly in the longitudinal direction and having a broken-line trace. These additional grooves 10' with the transverse grooves 11 and the longitudinal grooves 10 define blocks 1", 1"', the leading ridges of which, 23", 23"' respectively, have different lengths from the lengths of the trailing ridges, 24", 24"' respectively, so as to form a part of the block which is substantially more rigid than the other (the part having the longest ridge being the most rigid). The two longitudinal grooves 10 define a central tread part which also comprises transverse zigzag grooves 12. All the grooves 10, 10', 11, in the present case, have depths of 24 mm.

For each of the tread pattern blocks 1", 1"', the leading faces 3", 3"' are planar and have generatrices forming an angle α of 102° with the contact face of said block, while each trailing face 4", 4"' is formed by an upper part, the generatrix of which is inclined at an angle β of 78° extended by a lower part, the generatrix of which forms an angle δ of 102°, the angles β and δ being measured relative to the contact face. To adjust as well as possible the rigidity of the blocks 1", 1"' in order to obtain a low compressive strength while maintaining high shearing strength, there is formed by molding a series of recesses of rectangular section which are distributed regularly over the lower part of the trailing face and represent a groove ratio of the order of 50% of the total surface of said lower part.

The values selected for the angles α, β, δ make it possible to obtain a good compromise between the irregular wear performance (making it possible to avoid the appearance of more pronounced zones of wear) and the regular wear life performance (reduction in the rate of wear).

A comparative running test under rated conditions was carried out with tires of dimension 315/80 R 22.5 having a tread according to the invention and control tires of the same dimension sold under the name XDE2 and having the same constitution with the exception of the tread. The tires were twin-mounted on a driving axle of a heavy vehicle and were subjected to on-road travel for 100,000 km. During this travel, the differences in height of rubber of the two treads were measured at different points between the edges and the center of said treads.

It was noted that the tires provided with a tread according to the invention had wear on average 20% less than that noted on the control tires. Furthermore, it was observed that the tires provided with a tread according to the invention had irregular wear (that is to say, wear localized on some ridges as opposed to regularly distributed wear over the entire tread) which was very substantially reduced compared with that observed with the control tires, by about 15% (at the same amplitude of irregular wear, the mileage covered with the tire according to the invention is 15% greater).

The travel test results clearly show that the tread according to the invention makes it possible to reduce the rate of wear of said tread while delaying the appearance of irregular wear on the edges of the blocks and thus to increase the longevity of the tire provided with said tread.

Hitherto, interest has essentially been in tread patterns having a preferred direction of travel, but it is clear that in the case of a tread pattern not having an a priori direction of rotation a leading face and a trailing face may be produced having fairly similar characteristics in order that the rigidities of the part of the block close to the leading ridge and the part of the block close to the trailing ridge are comparable. For this, the leading face and the trailing face each comprise a first undercut part forming an angle of less than 90° with the running surface, extended by a lower part forming with the running surface an angle greater than 90°, each lower part being provided with at least one recess extending into the block as far as at least one plane perpendicular to the running surface and passing through the points longitudinally farthest to the inside of the lower parts. However, this tread pattern would not have the level of satisfaction obtained with the directional tread pattern according to the invention.

In combination with any one of the tread pattern variants described or suggested in the present description, it is also possible to produce a tread pattern comprising a plurality of blocks, at least one of the lateral faces which are defined by the longitudinal grooves of rectilinear general orientation comprises an upper part inclined so as to be undercut with the contact face, this upper part being extended in the direction of the thickness of the tread by a lower part oriented so as to form an angle greater than 90° with said contact face. Furthermore, said lower part is provided with at least one recess for limiting the rigidity of the block under loading, while maintaining sufficient shearing strength in a direction perpendicular to the circumferential direction on the tire equipped with this tread pattern. This is illustrated, for example, in the variant shown in FIG. 5.

Figure 5:
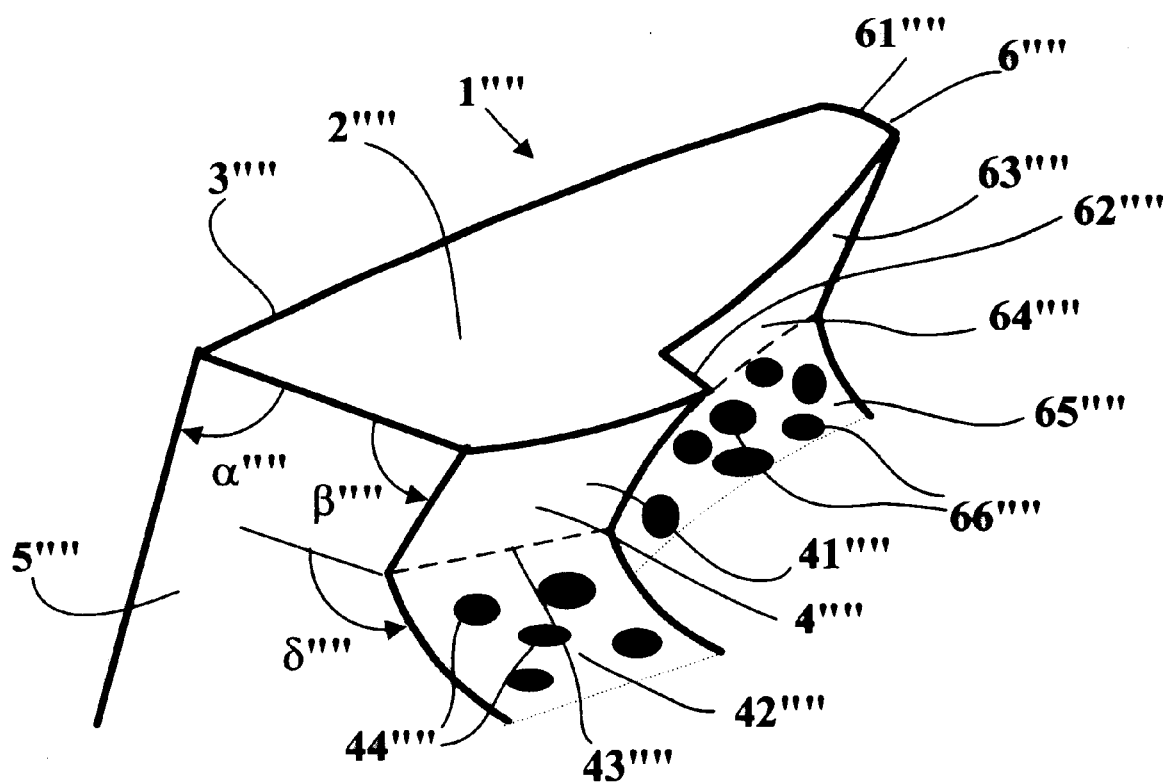
FIG. 5 shows another variant embodiment of a tread pattern according to the invention showing a tread pattern block provided with a plurality of recesses on its trailing face and on part of one of its lateral faces.

In this FIG. 5 there is shown, viewed in perspective, a block 1"" of the shoulder region of a tread for a heavy-vehicle tire such as shown, for example, in FIG. 4. This block 1"" has a running face 2"" intended to come into contact with the road, two lateral faces 5"", 6"" defining longitudinal grooves, a leading face 3"" and a trailing face 4"" defining at least in part transverse grooves. The leading face 3"" is a curved face inclined on average so as to form an angle α"" greater than 90° with the running face 2"".

The trailing face 4"" of the block 1"" has an upper part 41"" which is undercut relative to the contact surface 2"" of the tread pattern element 1"" with the running face 2"" of the block (angle β"" less than 90°); this upper part 41"" is extended in the direction of the thickness of the tread by a lower part 42"" inclined so as to form an average angle δ"" greater than 90° with the running face 2"". The parting line 43"" between the lower and upper parts is located at approximately 50% of the total height of the block.

Furthermore, a plurality of recesses 44"" open on to the lower part 42"" and extend into the block. The shape of the cross-sections of said recesses is circular in the example described, but of course any other shape is suitable.

Furthermore, one of the lateral faces 6"" of this block 1"" is formed of two faces 61"", 62"" substantially parallel to the other lateral face 5"", each of said faces 61"", 62"" being connected to the other by an oblique face 63"". Advantageously, said oblique face 63"" is formed of an upper part 64"" which is undercut relative to the contact face 2"", said upper part 64"" being extended by a lower part 65"" which is inclined so as to form an average angle greater than 90° with the running surface 2"" and comprising at least one recess 66"" to soften said lower part in compression without reducing the shearing strength under a substantially transverse force relative to said block (that is to say in an oblique direction relative to the longitudinal direction of the tread). In the case shown, the recesses formed on the trailing face and on part of at least one lateral face have similar geometries, but it is of course possible to differentiate them depending on the desired effect.

Preferably, the lower and upper parts of at least one tread pattern element are substantially planar, the upper part forming with the contact surface of said element when new an angle β of between 65° and 75°, the lower part forming with the same contact surface an angle δ which is between 95° and 125°.

Furthermore, it is advantageous for the angle β of the upper part of the trailing face to be substantially equal to 75° and for the angle δ of the lower part to be substantially equal to 108°.

Preferably, the recesses formed on the trailing face of at least one tread pattern element have different depths, the recesses located closest to the lateral faces having lesser depths, said depths being measured perpendicular to said trailing face.

I claim:

1. A tire tread for a heavy vehicle, comprising a plurality of tread pattern elements arranged so as to form a tread pattern having a preferred direction of travel, said elements having a contact face, two lateral faces, a leading face and a trailing face, the leading and trailing faces intersecting the contact face along a leading ridge and a trailing ridge, the leading ridge corresponding to that ridge of the block which first comes into contact with the ground, the leading and trailing faces having different inclinations, wherein the trailing face of at least one tread pattern element is formed of two parts which divide said trailing face into a lower part and an upper part in the direction of the height of the element, the upper part, extending from the contact face of said element, is inclined relative to the contact face so as to form an angle β less than 90°, the lower part, extending the upper part towards the inside of the tread, is oriented so as to form an angle δ greater than 90° with said contact face and is provided with at least one recess extending into the block at least as far as a plane perpendicular to the contact face and passing through the innermost point, in the direction of the thickness of the tread, of the lower part of the trailing face.

2. A tread according to claim 1, wherein the leading face is inclined such that the angle α measured in the element in relief between the leading face and the running face is greater than 90°.

3. A tread according to claim 1, wherein, when new, the total of the areas of all the recesses of the lower part of the trailing face of at least tread pattern element is between 30% and 70% of the total surface area of said lower part.

4. A tread according to claim 1, wherein for each tread pattern element comprising a trailing face formed of an upper part and a lower part the average height H of the upper part is between 20% and 80% of the total height P of said element.

5. A tread according to claim 1, wherein the angles β and δ of average inclination respectively of the upper part and of the lower part of the trailing face of at least one tread pattern element satisfy the following relationship:

$$\frac{1}{\tan\delta} > \frac{2H}{(H-P)\cdot\tan\beta}$$

in which H is the average height of said upper part and P the total height of said tread pattern element.

6. A tread according to claim 1, wherein the lower part of the trailing face of at least one tread pattern element comprises a plurality of recesses, the traces of which on the trailing face extend over the entire height of the lower part, said recesses being regularly distributed over this part in the transverse direction.

7. A tread according to claim 6, wherein the recesses formed on the trailing face of at least one tread pattern element have different depths, the recesses located closest to the lateral faces having lesser depths, said depths being measured perpendicular to said trailing face.

8. A tread according to claim 1, wherein the lower and upper parts of at least one tread pattern element are substantially planar, the upper part forming with the contact surface of said element when new an angle β of between 65° and 75°, the lower part forming with the same contact surface an angle δ which is between 95° and 125°.

9. A tread according to claim 8, wherein the angle β of the upper part of the trailing face is substantially equal to 75° and the angle δ of the lower part is substantially equal to 108°.

10. A tire provided with a tread provided with at least one tread pattern element defined according to claim 1.

11. A heavy-vehicle tire, the tread of which comprises a directional tread pattern formed by a plurality of grooves of generally circumferential orientation and a plurality of transverse grooves, said grooves defining a plurality of tread pattern motifs, each motif having a contact face, two lateral faces, a leading face and a trailing face, the leading and trailing faces intersecting the contact face along a leading ridge and a trailing ridge, the leading ridge corresponding to that ridge of the tread pattern block which first comes into contact with the ground, the leading face being oriented such that the angle α measured in the motif between the leading face and the contact face is greater than 90°, the trailing face having a part which is undercut relative to the running face, wherein the trailing face is formed of two parts which divide said trailing face into a lower part and an upper part in the direction of the height of the motif, the upper part extending from the running face of said motif, the lower part extending the upper part towards the inside of the tread, the lower part representing between 20% and 80% of the total height of the trailing face, the upper part of the trailing face being inclined at an angle β less than 90° relative to the contact face so as to be undercut, whereas the lower face, which is oriented so as to form an angle δ greater than 90° with the same contact face, is provided with a plurality of recesses which extend within the block at least as far as a plane perpendicular to the contact face and passing through the radially innermost point of the lower part of the trailing face, the total of the areas of said recesses on the lower part being between 30% and 70% of the total area of said lower part.

\* \* \* \* \*

UNITED STATES PATENT AND TRADEMARK OFFICE
CERTIFICATE OF CORRECTION

PATENT NO.   : 6,604,564 B1  
DATED        : August 12, 2003  
INVENTOR(S)  : Thiebaud It is certified that error appears in the above-identified patent and that said Letters Patent is hereby corrected as shown below:

<u>Title page,</u>  
Item [57], ABSTRACT,  
Line 5, "a" should read -- α --

<u>Column 2,</u>  
Line 39, "bloc" should read -- block --  
Line 48, "et" should read -- and --

<u>Column 3,</u>  
Line 21, "invention;" should read -- invention; and --

<u>Column 6,</u>  
Line 40, "on to" should read -- onto --

<u>Column 7,</u>  
Line 39, "at least tread" should read -- at least one tread --

Signed and Sealed this

Fourteenth Day of October, 2003

JAMES E. ROGAN  
*Director of the United States Patent and Trademark Office*